United States Patent
Pan

(10) Patent No.: US 8,897,711 B2
(45) Date of Patent: *Nov. 25, 2014

(54) WIRELESS USER EQUIPMENT FOR USE IN REDUCING CROSS CELL INTERFERENCE

(75) Inventor: Kyle Jung-Lin Pan, Smithtown, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 83 days.

This patent is subject to a terminal disclaimer.

(21) Appl. No.: 13/593,908

(22) Filed: Aug. 24, 2012

(65) Prior Publication Data

US 2013/0044579 A1   Feb. 21, 2013

Related U.S. Application Data

(63) Continuation of application No. 12/243,622, filed on Oct. 1, 2008, now Pat. No. 8,265,560, which is a continuation of application No. 11/099,325, filed on Apr. 5, 2005, now Pat. No. 7,450,905, which is a continuation of application No. 10/427,174, filed on May 1, 2003, now Pat. No. 6,882,849, which is a continuation of application No. 10/003,487, filed on Nov. 1, 2001, now Pat. No. 6,591,109.

(60) Provisional application No. 60/313,336, filed on Aug. 17, 2001.

(51) Int. Cl.
| | |
|---|---|
| H04B 1/00 | (2006.01) |
| H04B 7/216 | (2006.01) |
| H04B 7/26 | (2006.01) |
| H04W 72/08 | (2009.01) |
| H04W 24/10 | (2009.01) |
| H04W 28/04 | (2009.01) |

(52) U.S. Cl.
CPC ............ *H04W 72/082* (2013.01); *H04W 24/10* (2013.01); *H04W 28/04* (2013.01); *H04B 7/2618* (2013.01); *H04B 2201/709709* (2013.01)
USPC ........ 455/63.1; 455/452.1; 370/335; 370/336

(58) Field of Classification Search
USPC .............. 455/62, 63.1, 67.11, 67.13, 78, 450, 455/452.1, 509, 524; 370/329, 330, 335, 370/336, 337, 347
See application file for complete search history.

(56) References Cited

U.S. PATENT DOCUMENTS 5,355,522 A   10/1994  Demange
5,428,818 A *  6/1995  Meidan et al. ................. 455/436

(Continued)

FOREIGN PATENT DOCUMENTS

EP   0 837 616   4/1998
EP   1 087 630   3/2001

(Continued)

OTHER PUBLICATIONS

Chen et al., "A Dynamic Channel Assignment Algorithm for Asymmetric Traffic in Voice/Data Integrated TDMA/TDD Mobile Radio," (1997), pp. 215-219.

(Continued)

*Primary Examiner* — Quochien B Vuong
(74) *Attorney, Agent, or Firm* — Volpe and Koenig, P.C.

(57) ABSTRACT

A method for reducing cross cell interference in a wireless time division duplex communication system using code division multiple access, the system having at least one user equipment (UE) and a base station (BS) is disclosed. The method begins by measuring an interference level of each timeslot at the BS. A timeslot is eliminated for additional uplink communication if the measured interference level exceeds a first threshold. UEs in nearby cells that are large interferers are identified and their downlink timeslot usage is gathered. A timeslot is eliminated for uplink communication for a large interferer UE that uses the timeslot for downlink communication.

8 Claims, 4 Drawing Sheets

(56) References Cited

U.S. PATENT DOCUMENTS

| | | | |
|---|---|---|---|
| 5,448,761 A * | 9/1995 | Ushirokawa | 455/62 |
| 5,533,013 A | 7/1996 | Leppanen | |
| 5,594,946 A | 1/1997 | Menich et al. | |
| 5,898,928 A * | 4/1999 | Karlsson et al. | 455/450 |
| 5,937,336 A | 8/1999 | Kumagai | |
| 6,131,030 A | 10/2000 | Schon et al. | |
| 6,212,384 B1 | 4/2001 | Almgreen et al. | |
| 6,223,037 B1 | 4/2001 | Parkkila | |
| 6,320,854 B1 | 11/2001 | Farber et al. | |
| 6,360,077 B2 | 3/2002 | Mizoguchi | |
| 6,377,611 B1 | 4/2002 | Hwang | |
| 6,434,128 B1 | 8/2002 | Benz et al. | |
| 6,847,818 B1 | 1/2005 | Furukawa | |
| 2002/0015393 A1 | 2/2002 | Pan et al. | |

FOREIGN PATENT DOCUMENTS

| | | |
|---|---|---|
| EP | 1 122 895 | 8/2001 |
| GB | 2 320 648 | 6/1998 |
| JP | 08-065738 | 3/1996 |
| JP | 2002-232940 | 8/2002 |
| WO | 00/72459 | 11/2000 |
| WO | 01/22637 | 3/2001 |
| WO | 01/45445 | 6/2001 |
| WO | 02/05441 | 1/2002 |
| WO | 02/075963 | 9/2002 |

OTHER PUBLICATIONS

Dinan et al., "Spreading Codes for Direct Sequence CDMA and Wideband CDMA Cellular Networks," (1998), pp. 48-54.

Hara et al., "Time Slot Assignment for Cellular SDMA/TDMA Systems with Antenna Arrays," YRP Mobile Telecommunications Key Technology Research Laboratories Co., Ltd., Department of Electrics, Information Systems and Energy Engineering, Osaka University, pp. 1-4. (2001).

Holma et al., "Evaluation of Interference Between Uplink and Downlink in UTRA/TDD." IEEE Vehicular Technology Conference, 1999, pp. 2616-2620.

Kim et al., "Optimal Time Slot Assignment in CDMA Packet Radio Networks," (1996), pp. 1705-1709.

Lee et al., "An Adaptive Time Slot Allocation Strategy for W-CDMA/TDD System," IEEE VTS 53$^{rd}$ Vehicular Technology Conference, Rhodes, Greece, May 6-9, 2001, New York, NY, IEEE, vol. Conf. 53, May 6, 2001.

Mihailescu et al., "Dynamic Resource Allocation for Packet Transmission in UMTS TDD TD-CDMA Systems," IEEE, 1999, pp. 1737-1741.

Minn et al., "Dynamic Assignment of Orthogonal Variable-Spreading-Factor Codes in W-CDMA," IEEE Journal on Selected Areas in Communications, vol. 18, No. 8, Aug. 2000, pp. 1429-1439.

Ortigoza-Guerrero et al., "Evaluation of Channel Assignment Strategies for TIA Is-54 System," (1996), pp. 168-175.

"Physical Layer Measurements in UTRA TDD Mode." TSG-RAN WG1 Meeting #8, Hannover, Aug. 30-Sep. 3, 1999. TSGR1#6(99)a79.

Sourour, "Time Slot Assignment Techniques for TDMA Digital Cellular Systems," IEEE Transactions on Vehicular Technology, vol. 43, No. 1, Feb. 1994, pp. 121-127.

Takanashi et al., "Frequency-Segregated Dynamic Channel Allocation for Asynchronized TDMA/TDD Frame Among Base Stations," IEEE, 1996, pp. 933-937.

Wie et al., "Time Slot Allocation Scheme Based on a Region Division in CDMA/TDD Systems," VTC Spring 2001, IEEE VTS 53$^{rd}$ Vehicular Technology Conference, Rhodes, Greece, May 6-9, 2001, New York, NY IEEE, vol. Conf. 53, May 6, 2001.

* cited by examiner

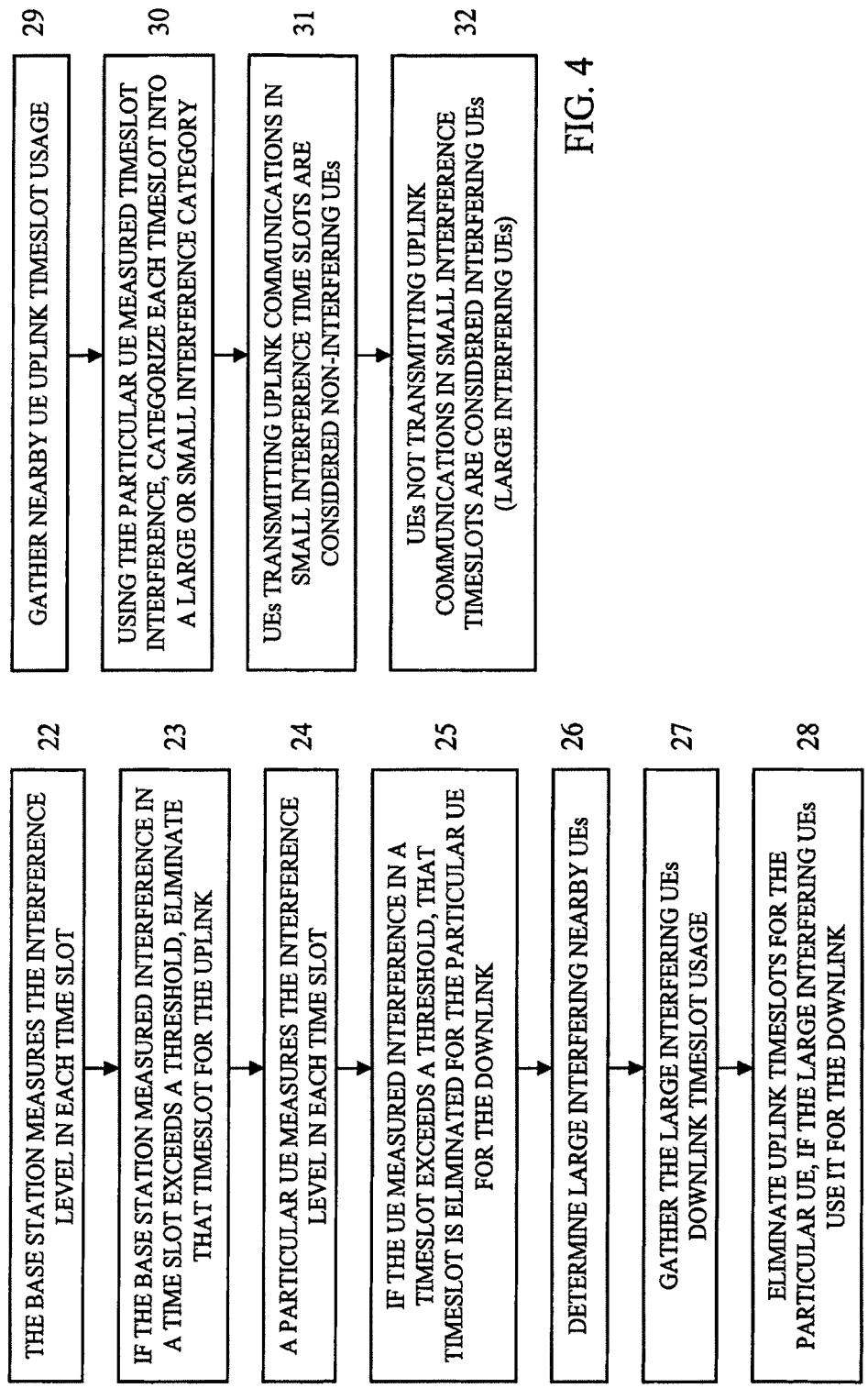

WIRELESS USER EQUIPMENT FOR USE IN REDUCING CROSS CELL INTERFERENCE

CROSS REFERENCE TO RELATED APPLICATIONS

This application is a continuation of U.S. patent application Ser. No. 12/243,622, filed Oct. 1, 2008, which is a continuation of U.S. patent application Ser. No. 11/099,325, filed Apr. 5, 2005, now U.S. Pat. No. 7,450,905, which is a continuation of U.S. patent application Ser. No. 10/427,174, filed May 1, 2003, now U.S. Pat. No. 6,882,849, which is a continuation of U.S. patent application Ser. No. 10/003,487, filed Nov. 1, 2001, now U.S. Pat. No. 6,591,109, which claims the benefit of U.S. Provisional Application No. 60/313,336 filed Aug. 17, 2001, which are incorporated by reference as if fully set forth herein.

FIELD OF THE INVENTION

The invention generally relates to wireless time division duplex (TDD) communication systems using code division multiple access (CDMA). In particular, the invention relates to reducing cross cell user equipment interference in such systems.

BACKGROUND

FIG. 1 is an illustration of a wireless TDD/CDMA communication system 10. The communication system 10 has base stations $12_1$ to $12_n$ (12) which communicate with user equipments (UEs) $14_1$ to $14_n$ (14). Each base station 12 has an associated operational area or cell. The base station communicates with UEs 14 in its cell.

In CDMA communication systems, multiple communications are sent over the same frequency spectrum. These communications are distinguished by their channelization codes. To more efficiently use the frequency spectrum, TDD/CDMA communication systems use repeating frames divided into timeslots, such as fifteen timeslots, for communication. In TDD, each cell's timeslots are used solely for either the uplink or downlink at a time. A communication sent in such a system has one or multiple associated code(s) or timeslot(s) assigned to it. The use of one code in one timeslot with spreading factor of sixteen is referred to as a resource unit.

Cross cell interference is a problem in such systems as illustrated in FIG. 2. If two different cell's UEs 14 are close to each other, their uplink transmissions interfere with the other UE's downlink transmissions in the same timeslot. As shown in FIG. 2, UE $14_1$ uplink transmission U1 interferes with UE $14_2$ downlink transmission D2. Likewise, UE $14_2$ uplink transmission U2 interferes with UE $14_1$ downlink transmission D1. Although the effective isotropic radiant power (EIRP) of UEs 14 is much less that base stations 12, the close proximity of the UEs 14 results in the unacceptable interference. This problem is exacerbated when adding new users or user services. Although a cell's base station and UE 14 may make timeslot interference measurements, such as interference signal code power (ISCP), to assure its new transmissions will not see unacceptable interference, other cells' users may end up experiencing unacceptable interference due to the new transmission. As a result, existing calls may be dropped or unacceptable quality of service (QOS) may occur.

Accordingly, it is desirable to reduce cross cell interference.

SUMMARY

A method for reducing cross cell interference in a wireless time division duplex communication system using code division multiple access, the system having at least one user equipment (UE) and a base station (BS) is disclosed. The method begins by measuring an interference level of each timeslot at the BS. A timeslot is eliminated for additional uplink communication if the measured interference level exceeds a first threshold. An interference level of each timeslot is measured at the UE, and the timeslot is eliminated for downlink communication for the UE if the measured interference level exceeds a second threshold. UEs in nearby cells that are large interferers are identified and their downlink timeslot usage is gathered. A timeslot is eliminated for uplink communication for a large interferer UE that uses the timeslot for downlink communication.

A system for reducing cross cell interference in a wireless time division duplex communication system using code division multiple access includes a user equipment (UE), a base station (BS), and a Node B. The UE includes an interference measurement device for measuring interference in a timeslot, a transmitter, and a receiver. The BS includes an interference measurement device for measuring interference in a timeslot, a transmitter, and a receiver. The Node B includes a resource allocation device configured to receive interference measurement values from the UE and the BS; eliminate timeslots for communication where the measured interference exceeds a first threshold; identify UEs in nearby cells that are large interferers; gather downlink timeslot usage for large interferer UEs; and eliminate a timeslot for uplink communication for a large interferer UE that uses the timeslot for downlink communication.

BRIEF DESCRIPTION OF THE DRAWINGS

FIG. 3 is a flow chart for UE cross cell interference reduction.

FIG. 4 is a flow chart for determining potentially interfered UEs.

FIG. 5 is an illustration of neighboring cell UE usage.

FIG. 6 is an illustration of large interfering UE timeslot usage.

FIG. 7 is an illustration of available UE timeslots.

DETAILED DESCRIPTION OF THE PREFERRED EMBODIMENTS

Figure 1:
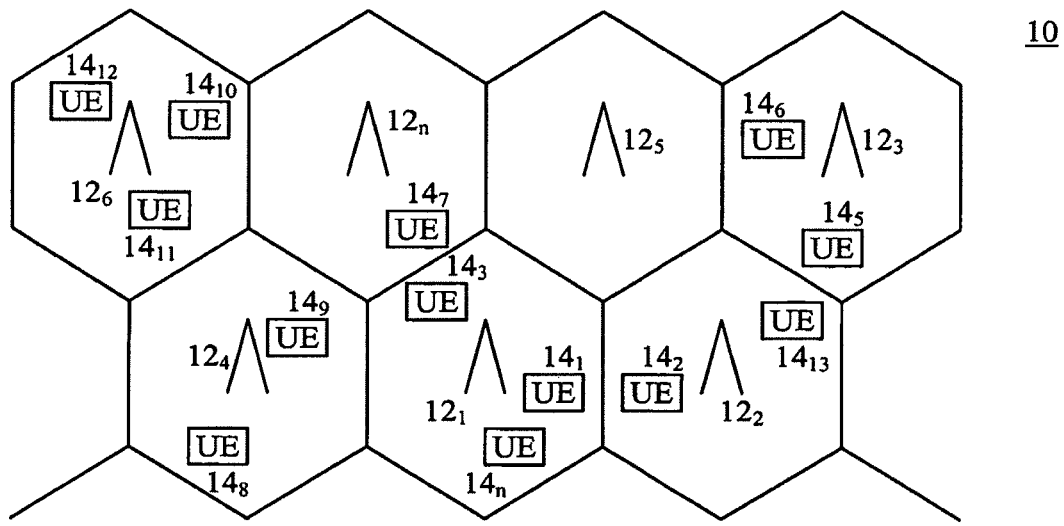
FIG. 1 is an illustration of a wireless TDD/CDMA communication system.
Figure 2:
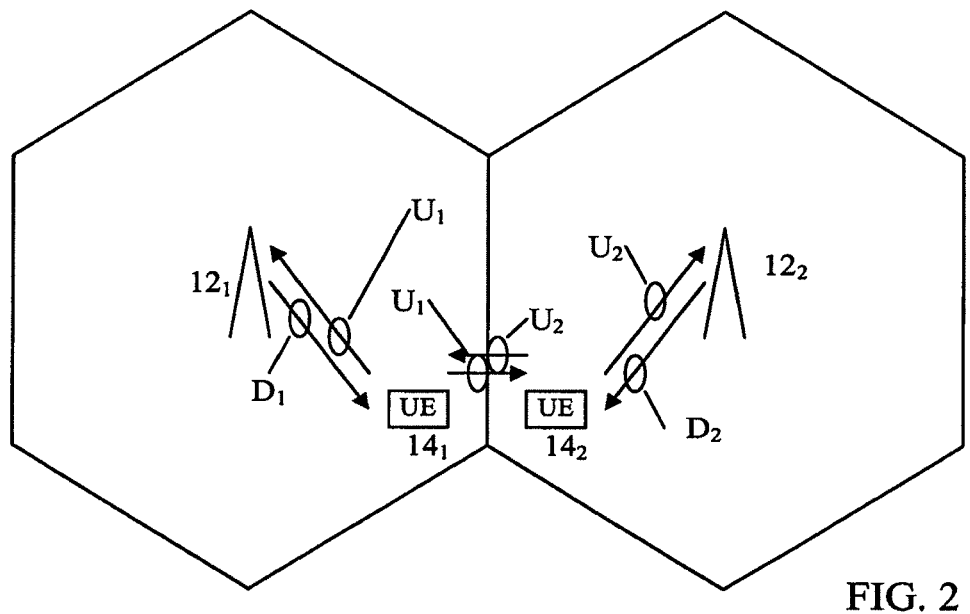
FIG. 2 is an illustration of cross interference between UEs.

Although the UE cross cell interference reduction is explained in the context of unsectorized cells, the approach is extendable to any UE operating area division, such as sectors of a cell. In such an extension, each operating area, such as a sector, is treated as a separate cell in the analysis.

FIG. 3 is a flow chart for UE cross cell interference reduction. For each cell, the cell's base station 12 measures the interference level in each timeslot, such as by using ISCP, step 22. The measured interference in each timeslot is compared to a threshold. If the measured interference in a timeslot exceeds the threshold, that timeslot is eliminated as a timeslot for any additional uplink communications in that cell, step 23. The threshold level is typically set by the system operator.

Each UE 14 measures the interference level in each timeslot, such as by ISCP, step 24. To determine available downlink timeslots for a particular UE 14, the measured interference in each timeslot is compared to a threshold. The threshold level is typically set by the system operator. If the measured interference exceeds the threshold, that timeslot is eliminated for the downlink for that particular UE 14, step 25.

Another concern is whether a particular UE's new uplink transmissions will interfere with another cell's UE downlink transmission. In TDD, UEs 14 in the same cell do not transmit on uplink and downlink in the same timeslot. Since the transmissions are new, other cells' UEs 14 cannot measure the resulting interference levels until the new transmissions begin. These new transmissions may result in a drop of a user or unacceptable QOS for existing users.

Figures 5, 6, 7:
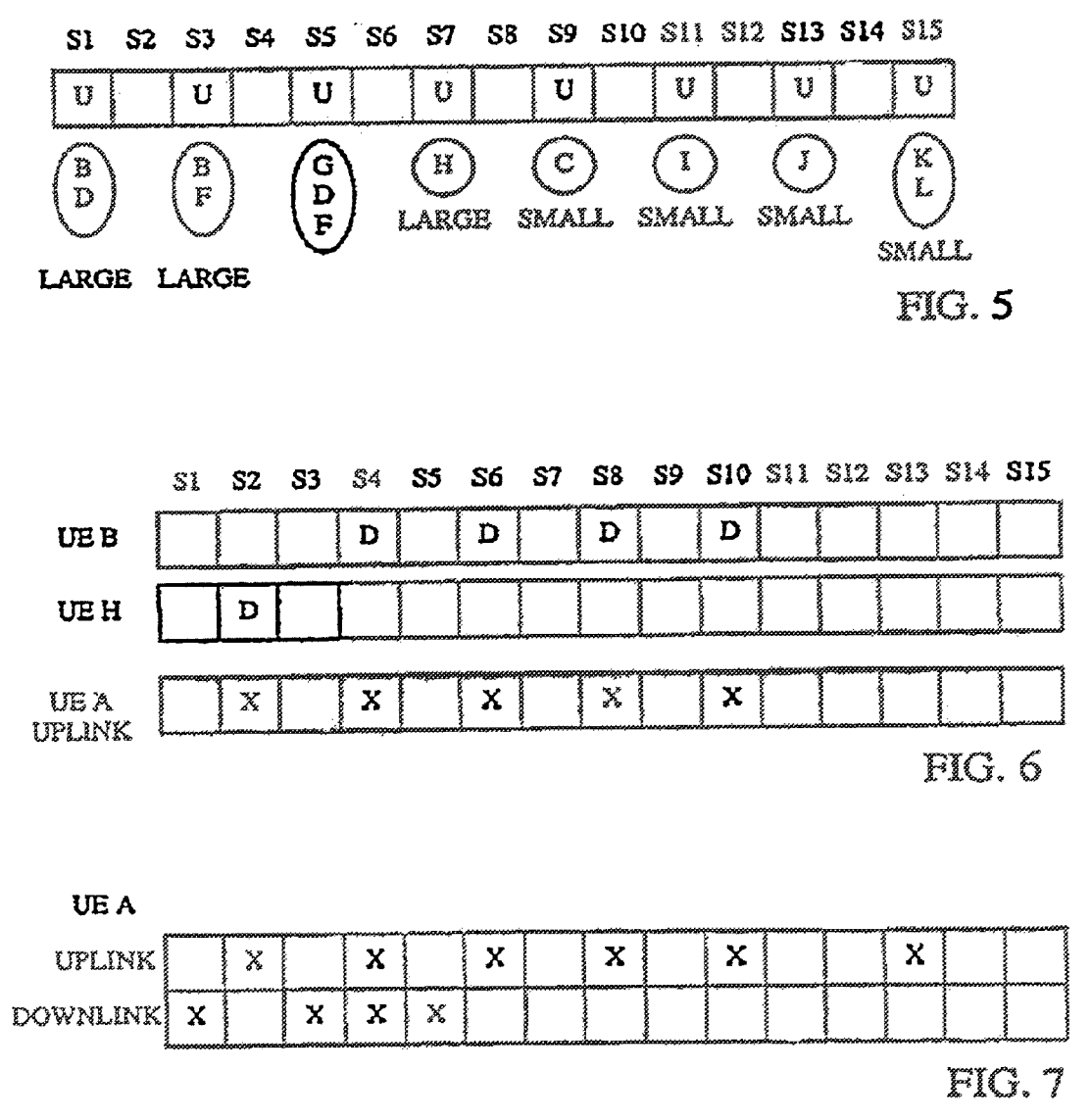

Determining other nearby cells' UEs 14 which may interfere with a particular UE 14 is per the flow chart of FIG. 4. Each neighboring cell's UE uplink timeslot usage is gathered, step 29. This usage is typically stored at the radio network controller (RNC) 42 and/or at the Node-B 46 (see FIG. 8). Only the UE usage of nearby cells or, alternately, only adjacent cells are used. Further cells' UEs 14 are too far away to suffer interference from the particular UE 14. An example of nearby UE uplink usage is shown in FIG. 5. Each UE 14 is represented by a different letter, "B" to "L". The particular UE 14 is an unshown letter "A".

Using the particular UE's timeslot interference measurements, the timeslots are categorized into either a large or small interference category, step 30. The small or large interference determination is performed such as by a threshold test. The threshold is typically set by the system operator. All nearby cell UEs 14 transmitting uplink communications in timeslots having a small interference are considered too far away to suffer interference from the particular UE's uplink communications, step 31. All the other UEs are considered to be potentially interfered with by this UE's uplink communications, step 32.

To illustrate using the example of FIG. 5, UE A has nearby UEs B-L. Uplink timeslots are indicated with a "U". Out of the eight uplink timeslots (slots S1, S3, S5, S7, S9, S11, S13, S15), three slots have large interference (slots S1, S3 and S7) and five have small interference (slots S5, S9, S11, S13 and S15). The UEs 14 transmitting in small interference uplink slots are UE C, D, F, G, H, I, J, K and L and in large interference uplink slots are UE B, D, F and H. Although UE D and F have an uplink transmission in a large interference cell, they also have an uplink transmission in a small interference cell. As a result, UE D and F are not considered the interfering UEs 14 in the large interference timeslots. In this example, UE B and H are determined to be the interfering UEs.

In this simplified example, there was no ambiguous information. However, ambiguous information may exist. For instance, if UE H also had an uplink transmission in a small interference cell, such as slot S9, the information is ambiguous. UE H would be considered both a large interferer in slot S7 (being the only uplink user) and a small interferer in slot S9. In a conservative implementation, UE H could be deemed a large interferer. In a more aggressive implementation, UE H could be deemed a small interferer. There may be an unaccounted for interferer or interference source in that timeslot (slot S7).

Another situation where ambiguous information may occur is where multiple potential large interferers transmit uplink communications in the same timeslots. To illustrate, UE H may also transmit in the uplink in slots S1 and S3. As a result, UE B may or may not be a large interferer. UE H may be the only large interferer. In this case, UE B is still deemed a large interferer to be conservative.

After the large interferer UEs 14 are determined, step 26 (FIG. 3), those UEs' downlink timeslot usage is gathered, such as in FIG. 6, step 27. For all the timeslots that the large interferers use for the downlink, that timeslot is eliminated for the uplink for that UE, as shown by an "X", step 28. As a result, a table such as in FIG. 7 is produced. The table indicates which timeslots are available to the particular UE 14. The available timeslots are blank and the non-available have an "X". Timeslots are assigned to the particular UE by selecting from the non-eliminated timeslots.

Figure 8:
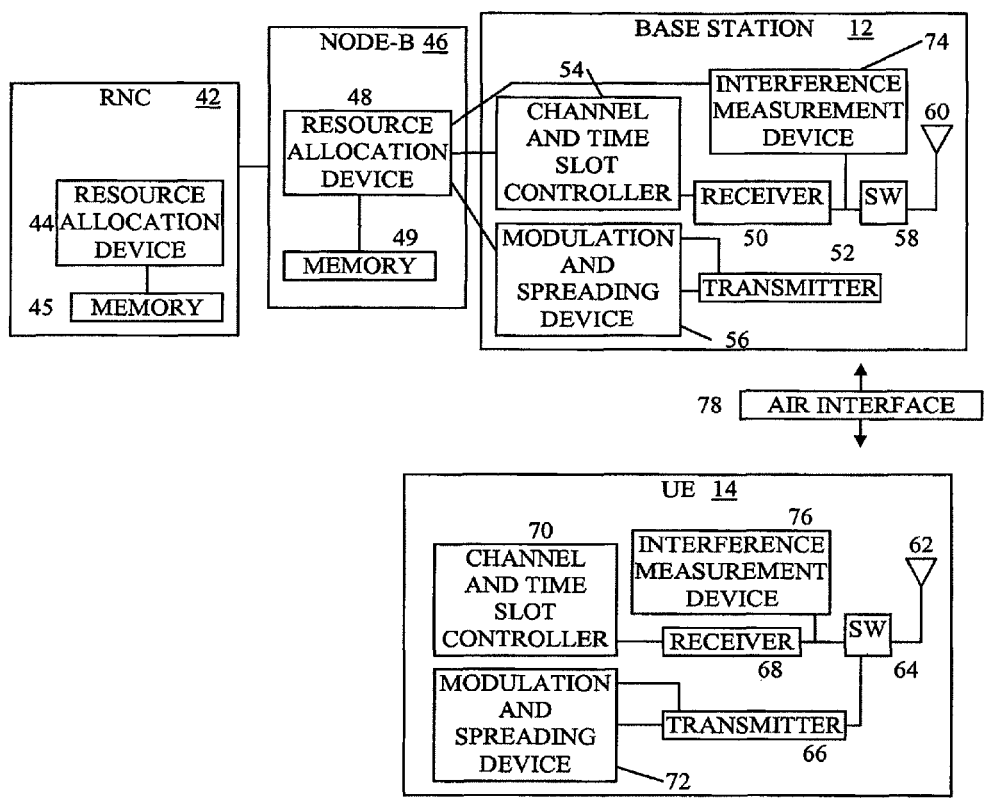
FIG. 8 is a simplified UE cross cell interference reduction system.

FIG. 8 illustrates a simplified system implementation for cross cell UE interference reduction. The RNC 42 has a resource allocation device 44. The resource allocation device 44 allocates the resources, such as code and timeslot assignments, for the cells. The resource allocation device 44 has an associated memory 45 for storing information, such as UE code and timeslot assignments, interference measurements and UE timeslot availability lists. Depending on the type of system, the computational component of cross cell UE interference reduction may be performed by the RNC resource allocation device 44, the Node-B resource allocation device 48 or shared between the two. Typically, performing the computation at the Node-B 46 allows for faster updates.

The Node-B 46 communicates with the radio network controller 42. The Node-B 46 has a resource allocation device 48 and an associated memory 49. The resource allocation device 48 allocates resources to that Node-B's users. The resource allocation device memory 49 stores information, such as the Node-B's UE timeslot and code assignments, interference measurements and UE timeslot availability lists.

The Node-B 46 typically communicates with a group of base stations 12. The base station 12 has a channel code and timeslot controller 54. The channel code and timeslot controller 54 controls the timeslots and channel codes assigned to user communications as directed by the Node-B 46 and RNC 42. A modulation and spreading device 56 processes data to be transmitted to the users. The data is processed to be time multiplexed with a channel code as directed by the channel and timeslot controller 54. A transmitter 52 formats the processed data for transfer over the radio interface 78. The resulting signal passes through an isolator or switch 58 and is radiated by antenna or antenna array 60.

Signals are received by the base station 12 using the antenna or antenna array 60. The received signals pass through the isolator or switch 58 to a receiver 50. The receiver 50 processes the received signals with channel codes in the timeslots directed by the channel code and the timeslot controller 54 to recover the received user data. The base station 12 also has an interference measurement device 74. The interference measurement device 74 measures the timeslot interference levels.

The UE 14 receives signals over the radio interface 78 using its antenna or antennal array 62. The received signals pass though an isolator or switch 64 to a receiver 68 to recover the received data for the user as directed by the channel code and timeslot controller 70. The channel code and timeslot controller 70 sends the channel code and timeslot information to the receiver 68 and UE modulation and spreading device 72. The controller 70 also retrieves the code and timeslot assignments signaled by the base station 12.

A UE interference measurement device 76 measures the interference levels in the timeslots. The modulation and spreading device 72 processes user data with the channel codes and timeslots as directed by the UE controller 70. The processed data is formatted for transmission over the air interface 78 by the transmitter 66. The resulting signal passes through the isolator or switch 64 and is radiated by the antenna or antenna array 62.

What is claimed is:

1. A wireless network device comprising:
a resource allocation device configured to schedule user equipments (UEs) using a plurality of resources;
wherein the resource allocation device is further configured to receive an indication for each of the plurality of resources for a neighboring wireless network device; each indication having one of two values; wherein a first of the two values indicates a small interference and a second of the two values indicates a large interference; and
wherein the resource allocation device schedules UEs in response to the received indications.

2. The wireless network device of claim 1 wherein the indication of small interference or large interference is determined using a threshold test.

3. The wireless network device of claim 1 wherein the resource allocation device is further configured to receive an indication having one of the two values for each of the plurality of resources for another neighboring wireless network device.

4. The wireless network device of claim 1 wherein the wireless network device is a Node-B.

5. A method for use by a wireless network device, the method comprising:
receiving an indication for each of the plurality of resources for a neighboring wireless network device; each indication having one of two values; wherein a first of the two values indicates a small interference and a second of the two values indicates a large interference; and
scheduling UEs in response to the received indications.

6. The method of claim 5 wherein the indication of small interference or large interference is determined using a threshold test.

7. The method of claim 5 further comprising receiving an indication having one of the two values for each of the plurality of resources for another neighboring wireless network device.

8. The method of claim 5 wherein the wireless network device is a Node-B.

* * * * *